Jan. 28, 1969  L. O. EGER  3,423,766
SANITATION SYSTEM

Filed Oct. 13, 1965  Sheet 1 of 2

INVENTOR.
Leroy O. Eger
BY
George H. Baldwin
ATTORNEY

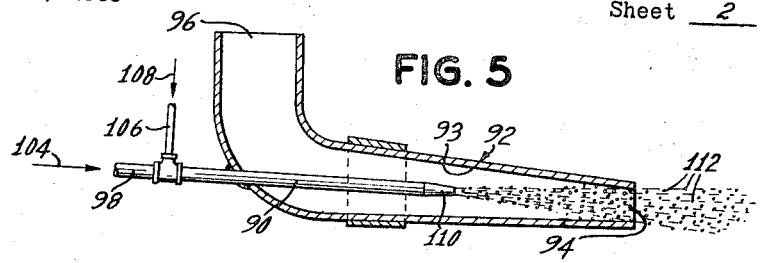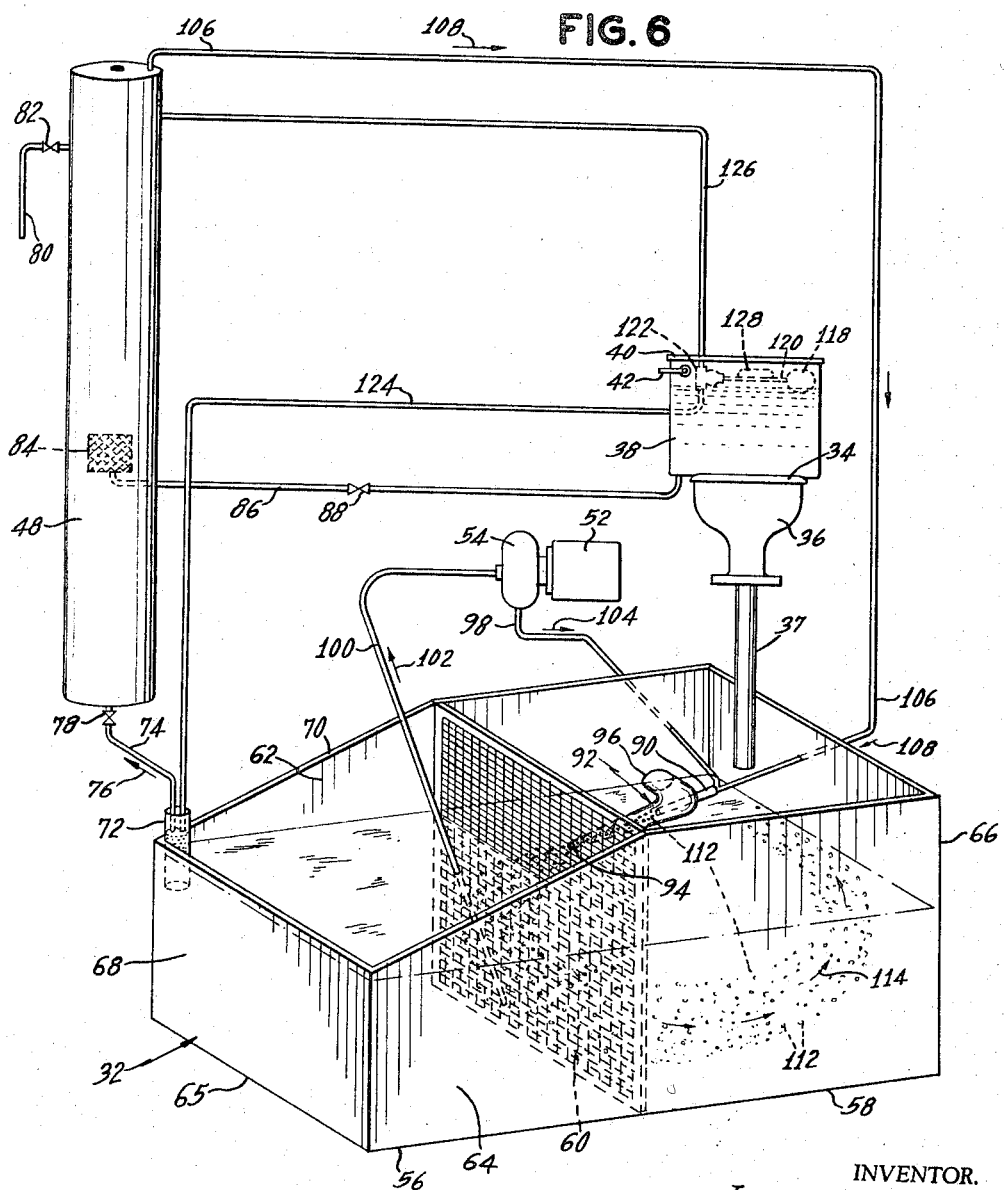

United States Patent Office 3,423,766
Patented Jan. 28, 1969

3,423,766
SANITATION SYSTEM
Leroy O. Eger, P.O. Box 5707,
Jacksonville, Fla. 32207
Filed Oct. 13, 1965, Ser. No. 495,645
U.S. Cl. 4—115
Int. Cl. E03d 7/00
12 Claims

ABSTRACT OF THE DISCLOSURE

A portable self-contained toilet and sewage treatment plant having a flush type toilet including a water storage tank and toilet bowl for the deposit of waste and excreta, with the water storage tank containing a float and lever arm connected thereto. The system includes a sewage treating tank positioned below the toilet for receiving and treating water and the waste and excreta deposited in the toilet bowl, with an upright screen extending from top to bottom across the mid-section of the sewage treating tank to divide the tank into forward and rearward sections, the water and waste being received in the rearward section and the screen maintaining the waste in the rearward section.

---

This invention pertains to a waste disposal system, and more particularly, the invention relates to a method and apparatus for the disposal and treatment of sewage.

It is a general object of this invention to provide a method and improved apparatus for the disposal of human excrement and the treating of decomposable waste materials.

Many times situations arise in which it is desirable to install toilet facilities on a temporary basis or in places where the normal facilities of a more permanent nature would be impractical. The need for such temporary facilities often arises at construction sites, especially those remote from existing sewer lines and in other undeveloped areas. Other situations where it would be desirable to have temporary toilet facilities include camping and recreational facilities, barracks and camps, and at other temporary buildings of one sort or another. Additionally, toilet facilities of a less permanent nature may be desired where the ground is very hard and impermeable, or where the bedrock is at the ground surface or very near thereto, and at other such places where it would be impossible or impractical to install the normal permanent type toilet facilities. General objects of the invention include the provision of an improved portable and self-contained toilet and sewage treatment plant.

While the prior art shows a number of self-contained toilet facilities many of these have drawbacks and disadvantages. Some of the prior art facilities are not necessarily of a portable nature, which trait is extremely desirable in a toilet facility which is to be installed on a temporary basis. Additionally, many of the prior art devices employ equipment which is of a non-standard and unfamiliar nature from the well known and normally used toilet equipment. Many of the devices make use of a macerating means or unit through which all waste materials must pass and which is of a metal construction having grinding means such as closely fitting teeth or grinding surfaces contained therein. Should a hard object such as a rock, piece of metal, tool, or the like be dropped into the toilet, the macerating unit would become jammed and/or broken and the toilet unit would no longer function. Among the specific objects of this invention is the provision of a portable and self-contained waste disposal system wherein the macerating means employed are other than the grinding type and are not cloggable by waste or damageable by a hard foreign object accidentally entering the system through the toilet bowl.

A general object of the instant invention is to provide a waste disposal system wherein the necessity of using septic tanks, drain fields, and elaborate sewage systems with the consequent consumption of large quantities of water for flushing is avoided.

A further general object of the subject invention is to provide an efficient waste disposal system which is sanitary and which does not require any separating, chemical treating, or settling steps or equipment.

Another object of this invention is to provide a sewage disposal system which is self-contained, is of a simple construction, is reliable and economical in operation, and is readily transportable.

Still another object of the invention is to provide a self-contained toilet and sewage treatment plant which may be readily installed for temporary use and is easily transported from one location to the next.

A specific object of this invention is to provide a self-contained toilet and sewage treatment plant which employs a standard flush-type tank toilet.

A further specific object of the invention is to provide a self-contained toilet and sewage treatment plant wherein the macerating means not only macerates the waste, but also, and simultaneously, aerobically treats the sewage and circulates the flushing fluid within the system.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings. in which:

FIG. 5 is an enlarged sectional view of the aspirator and adjoining housing components of the apparatus of this invention; and FIG. 6 is an enlarged schematic and pictorial view of the operative apparatus and system of this invention.

Figure 1:
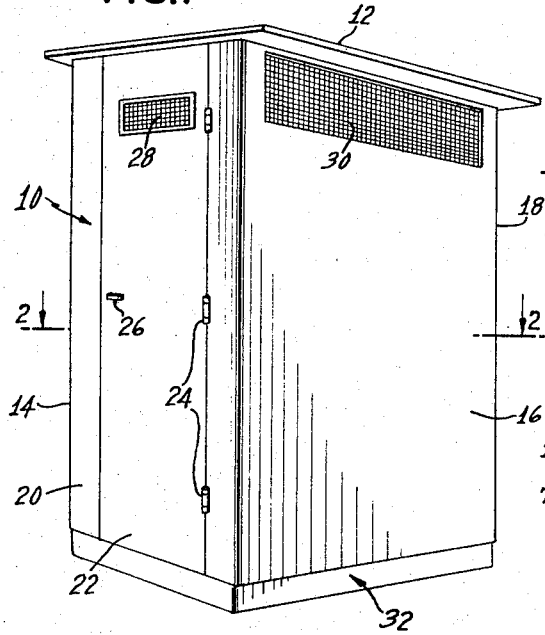
FIG. 1 is a front perspective external view of the housing containing the toilet and sewage treatment apparatus of this invention.

Referring now to the drawings in detail, wherein like reference numerals indicate like parts throughout the several views thereof; and in particular to FIG. 1 wherein the system of this invention is seen to be enclosed in a small housing 10, housing 10 including a roof 12 extending outwardly over vertically upstanding side walls 14 and 16, a vertically upstanding back wall 18 and a vertical upstanding front 20. A door 22 is pivotally mounted to front wall 20 by a series of hinges 24 such that the door may provide an entry and exit opening into the housing 10. Door 22 has a small handle 26 to aid one in opening and closing the same and a small screened aperture 28 in its upper portion to provide for ventilation within the housing 10. Additionally, vertical side walls 14 and 16 and back wall 18 are provided with screened openings, such as 30 in side wall 16, in their upper portions to also aid in the ventilation of the interior of housing 10. The housing 10 is mounted over and on sewage holding and treating tank 32, to be described more fully hereinafter, such that the entire system may be easily and readily moved and transported to any location where it is desired to use the self-contained toilet and sewage treatment plant of this invention.

Figure 2:
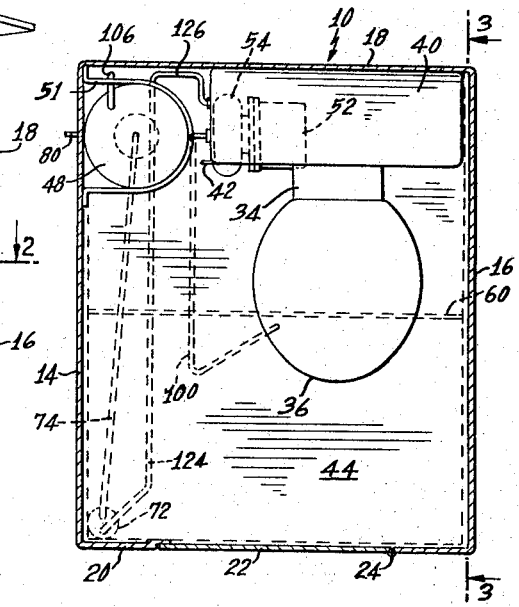
FIG. 2 is an enlarged cross-sectional view taken along line 2—2 of FIG. 1.
Figure 3:
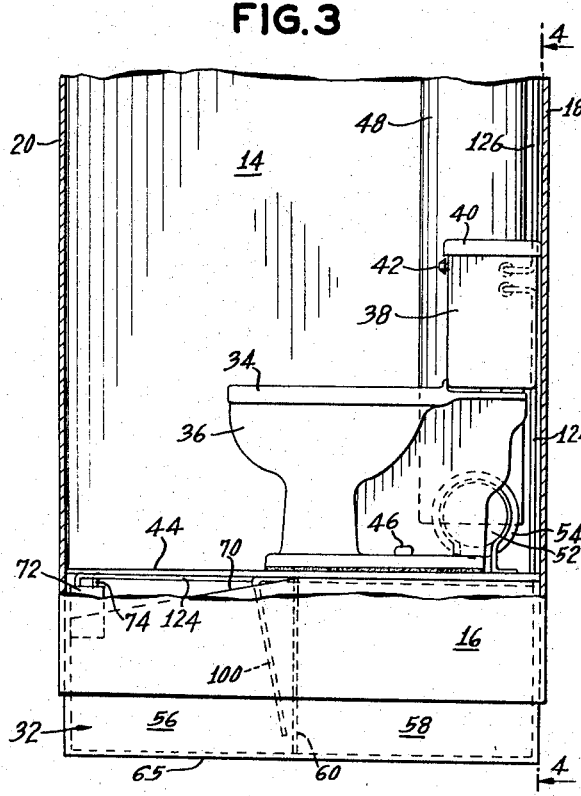
FIG. 3 is a partial cross-sectional view taken along line 3—3 of FIG. 2.
Figure 4:
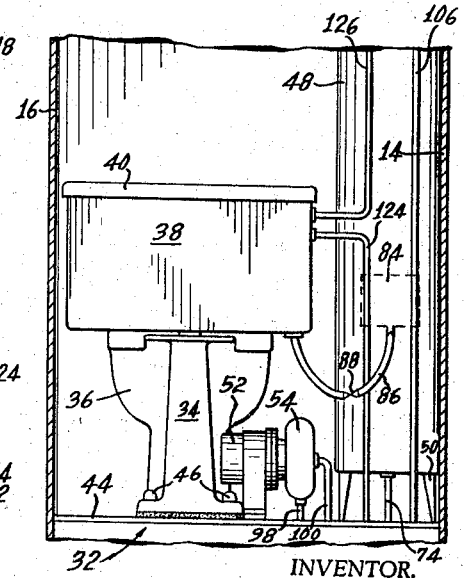
FIG. 4 is a partial cross-sectional view taken along line 4—4 of FIG. 3.

Contained within housing 10 is the apparatus of the system of this invention; and as seen in FIGS. 2, 3, and 4 comprises the common ordinary type of flush toilet 34. The toilet 34 has a bowl 36 for the deposit of human excrement and waste from which the same may be flushed, exiting from the toilet bowl 36 through toilet drain pipe 37, and a tank 38 for water storage to aid in the flushing of bowl 36. The toilet bowl 36 is usually provided with the normal seat and cover therefor (not shown). Water storage tank 38 is provided with the normal tank lid or cover 40 and a small handle 42 is provided by which the flushing cycle is activated.

The toilet 34 rests on and is mounted to floor or platform 44 by bolts covered by caps or covers 46, toilet 34 overlying the top of sewage holding and treating tank 32. A large cylindrical tank 48 is supported on floor 44 by legs 50, and is attached to side wall 14 by the use of U-shaped brackets such as at 51. Tank 48, as will be seen hereinafter, is used to hold and treat the fluid used in the sewage treatment system of this invention. Also mounted to floor 44 and positioned between the base of the toilet 34 and the bottom of upstanding cylindrical tank 48 is a small electrical motor 52 which is connected to and drives adjacently mounted centrifugal pump 54. The motor and pump provides the operating power for the entire system; that is, the means for macerating the waste, the means for aerobically treating the sewage, and the means for circulating water and fluid within the system are all operated by motor 52 and pump 54.

Underlying floor 44 is tank 32 (see FIG. 3) which holds and treats the sewage deposited therein when the system is in operation. This tank 32 is divided into a forward section 56 and a rearward section 58 by the use of a vertical screen 60 extending across the midsection thereof, see FIGS. 3 and 6. The openings or mesh of screen 60 is small enough in size that it will not permit particles and bits of waste to pass therethrough, and will prevent the same from passing from the rearward section 58 into the forward section 56 of tank 32; but the mesh or openings in this screen 60 are sufficiently large in size to easily and readily permit the flow and passage therethrough of water. It has been found that a screen having ⅛ inch openings has been acceptable for the intended purposes hereof. The sewage holding and treating tank 32 has two vertical upstanding side walls 62 and 64, a flat bottom 65, a vertical upstanding back wall 66 and a vertical upstanding front wall 68. The top of tank 32 is open over the rearward section 58 thereof; the same being covered by the floor or platform 44 when the tank is in place within the housing 10. The forward portion 56 of this sewage holding and treating tank 32 is provided with a sloping or inclined top 70, through which extends near one of the corners of its lower most portion an upright stand-pipe 72. The bubbles and foam which become entrained in the fluid within forward section 56 move upward along the underside of inclined top 70 to the dividing screen 60 and move therethrough into the rearward section 58 where they aid in the sewage treatment being carried out in this section 58, and/or leave the system through the open top of section 58. The top of standpipe 72 rises to a height equal to the height of the screen 60 and backwall 66 such that water and fluid within this tank 32 may rise within standpipe 72 to the same level as that in rearward portion 58 without overflowing through the standpipe.

Leading upward from the upper portion of standpipe 72 is a flow line 74 which is connected to and communicates with fluid holding and treating tank 48 through the center of its bottom wall portion. Fluid circulates within the system from sewage holding and treating tank 32 into fluid holding and treating tank 48 through flow line 74 in the direction of arrow 76. A check valve 78 is provided in flow line 74 for preventing the return of fluid from tank 48 back into sewage tank 32.

Connected to and extending through the upper portion of tank 48 is an overflow line 80 leading from tank 48 to an absorption pit (not shown). Within the overflow line 80 is an air tight check valve 82 to permit any surplus water to be released when there is no vacuum within the upper portion of tank 48. Overflow line 80 is provided to handle and drain off any excess fluids which may from time to time build up within the system in the event that tank 48 should be over filled, or that the fluid added to the system from a constant or continued use of the toilet 34 exceeds the amount of fluid evaporated from the system. The fluid that may from time to time exit the system through overflow line 80 has been observed to be clear, odor-free water. The fluid level maintained within tank 48 will normally be below overflow line 80 but substantially above the half-way mark of the tank 48 to permit refilling of toilet tank 38. After toilet 34 has been flushed and the water contained within the toilet tank 38 has flowed therefrom, tank 38 will be refilled by gravity feed with the water which has been held in holding tank 48. The refilling water will flow from tank 48 through a small filter 84 contained therein and through fill line 86 and check valve 88 over to and up into toilet tank 38 such that the toilet 34 will be ready for another complete flushing cycle at a later time. The check valve 88 in flow line 86 prevents the backflow into holding tank 48 of the water once it reaches toilet tank 38.

Contained within the rearward section 58 of the sewage holding and treating tank 32 is an aspirator 90, which with its associated parts completely breaks down and macerates the sewage and waste materials deposited within this system. Also, aspirator 90 aerobically treats the sewage by means of jetting air and oxygen through the same and circulates the sewage within tank 32 such that it is continually treated thereby. The aspirator 90 and its concomitant parts, additionally circulates the fluid within the system such that it is used over and over again therein.

The aspirator 90 is clearly shown in FIG. 5 and is seen to be contained within a curved hollow tubing or housing 92 having a tapered passageway 93 with a nozzle-like opening 94 adjacent its forward end and a larger opening 96 at its rearward end. The aspirator 90 is driven by pump 54 through the pump discharge line 98 which line is connected to the discharge side of the pump at one end and the aspirator at the other end thereof. As set forth hereinabove, pump 54 is driven by the small electric motor 52 connected to a source of electric current (not shown). The intake side of pump 54 is connected to intake line 100, the opposite end of which is open and is positioned adjacent screen 60 within the forward portion 56 of sewage holding and treating tank 32 and is also spaced adjacently above the bottom 65 thereof to insure that the fluid drawn through this line contains substantially no large particles of waste or sewage which might clog pump 54 and interfere with the action of aspirator 90. The water and fluid is drawn from forward section 56 through the open end of intake line 100 and up into pump 54 in the direction of arrow 102 then out the discharge side of the pump down discharge line 98 in the direction of arrow 104 to the aspirator 90.

Additionally, connected to the aspirator 90 is one end of an air intake or air supply line 106, the other end of which is connected to and extends through the top of the tall cylindrical tank 48. As pump 54 pumps water down discharge line 98 in the direction of arrow 104 to the aspirator, the water as it rushes by the connection or air intake line 106 to the aspirator draws air through air intake line 106 in the direction of arrow 108 into the aspirator by a vacuum or sucking action. The air and water mix within the aspirator and exit through the aspirator nozzle or orifice 110 in a forceful jet of water and fine air bubbles 112. This strong jet of air and water exiting aspirator nozzle 110 is directed forcefully against the sides of the nozzle or sloping portion of tube 92 and out the nozzle opening 94 of the tube. Due to the rushing, turbulent and forceful action at the nozzle 110 of aspirator 90 and throughout the rearward section 58 of tank 32, sewage and waste are drawn into tube 92 through its larger opening 96 such opening being disposed adjacent the surface of the fluid within the tank 32. The sewage and waste which are drawn into tube 92 through its large end 96 continues in a path along the inside of tube 92 until it reaches the aspirator nozzle 110, where it is exposed to the forceful jet of the aspirator and by means of the aspirator jet in the confining side walls of the tube 92 it is broken up, comminuted, pulverized and macerated into very fine and small particles. If some pieces of waste or sewage larger than the screen size are not completely broken down they are re-circulated within the rearward portion 58 of tank 32. The aspirator 90 and surrounding tube 92 are preferably positioned in rearward portion 58 with large open end 96 of tube 92 at, on, or near the fluid surface within the tank 32 such that all floating debris, waste, and sewage may be easily drawn thereinto and exposed to and treated by the aspirator jet.

The aspirator 90 is effective to continually jet air and oxygen through the sewage and fluid contained in tank 32 and to aerobically treat the same and oxidize and decompose the waste material contained therein. This aerobic process decomposes by wet combustion the organic or carbonaceous matter in this tank 32 and is thus a purifying or septicizing operation. The air and oxygen in the form of fine bubbles 112 is jetted down through the fluid and waste mixture within tank 32 and circulates back up to the top of the fluid therein in the direction of arrow 114 such that there is a constant and continual turbulence and circulation of air and oxygen within this tank to aerobically treat and decompose the waste materials therein.

The aspirator is also positioned to direct the aspirator jet of water and fine bubbles at and across vertical screen 60 in such a manner that the screen is washed and maintained clear and free of small particles which might otherwise gather thereon and clog the same. The screen 60, as previously explained, retains any large particles, which are not completely broken down by the aspirating means, within the rearward portion 58 of tank 32 and prevents the same from entering forward portion 56 and being drawn into pump intake line 100.

As hereinbefore stated, the air intake or air supply for aspirator 90 is provided through air line 106 entering thereinto in the direction of arrow 108. The air and oxygen is sucked through this line by the action of the aspirator from the top of fluid holding and treating tank 48 above the fluid level maintained therein. Thus sucking action of air from the top of tank 48 causes a partial vacuum to be maintained within tank 48 above the fluid level therein. Once the vacuum in the upper portion of tank 48 is attained, additional air and oxygen for use in the aspirator is obtained by pulling air from the standpipe 72, flow line 74 and upwards through all of the fluid column contained within tank 48, then out air supply line 106 to the aspirator 90. The drawing of air from standpipe 72, through flow line 74 and bubbling the same through the fluid column in tank 48 causes further aerobic treatment of the fluid within tank 48 and the further oxygen decomposition of any decomposable fine organic waste materials that may be entrained with the fluid within tank 48, such aerobic treatment and decomposition insuring that the fluid used for the flushing action or that any fluid leaving the system through overflow line 80 is relatively clear, non-toxic, odor-free and sanitary water.

The vacuum which is formed or drawn in the upper portion of tank 48 by the air supply line 106 and the aspirator 90 charges and fills tank 48 with water and fluid from tank 32 through standpipe 72 and flow line 74 after an amount of fluid within tank 48 is used to refill toilet tank 38 after a flushing of toilet 34, which operation will be explained more fully hereinafter.

Contained within the toilet water storage tank 38 is a float operated valve 122 which is operated by float 118 and connecting lever arm 120. Valve 122 is normally in the closed position when lever arm 120 and float 118 are generally in a horizontal position with the float 118 floating on the surface of a substantially full tank of water, as depicted in FIG. 6. When the toilet 34 is flushed using the flushing lever 42 and the water contained in toilet tank 38 empties into bowl 36, the lever arm 120 and float 118 fall downward within the tank and open valve 122 permitting the release of the vacuum in the upper portion of tank 48, which in turn will allow water to enter the toilet tank 38 via fill or flow line 86 from fluid holding and treating tank 48. When enough water has again entered tank 38 to raise the float 118 and connected lever arm 120 to the near horizontal position, valve 122 becomes closed, thus closing the vacuum release, the vacuum is restored in the upper portion of tank 48, and water no longer enters the toilet tank 38 through fill line 86. Connected to the lower side of valve 122 is an air line 124 one end of which communicates with valve 122 and the other end of which is open and terminates in standpipe 72 adjacent the bottom of flow line 74. Attached to the upper side of valve 122 is another air line 126 one end of which communicates with the valve 122 and the other end of which is connected to and extends through the upper wall portion of cylindrical tank 48. These two air lines 124 and 126 function to relieve the vacuum in the upper portion of tank 48 above the fluid contained therein when valve 122 is in the open position. When this vacuum is released and the pressure is equalized, the column of fluid contained in tank 48 will gravity feed from the tank 48 through fill line 86 and into toilet tank 38 refilling the same and preparing the toilet for another flushing cycle. When tank 38 is filled and valve 122 is closed, fluid ceases to flow from tank 48, vacuum is restored in the upper portion of tank 48 and air is sucked from the forward portion 56 of tank 32 from standpipe 72.

Mounted on lever arm 120 near its mid-portion is a mercury switch 128. Switch 128 is connected to a source of electrical current (not shown) and to the motor 52 controlling the operation thereof. When the lever arm 120 is in the position shown in FIG. 6, mercury switch 128 is in the open position with the motor being inoperative, but when the lever arm 120 is in its downward position switch 128 closes and motor 52 is connected to the source of electrical current and operates to drive pump 54 and aspirator 90. Thus when the toilet 34 is flushed and the water within tank 38 moves downward, float 118 and lever arm 120 carrying mercury switch 128 move downward closing switching 128 and making the circuit between the motor 52 and the source of electrical current for operating the system. When the toilet tank 38 refills with water and the float 118 and lever arm 120 are floated to the generally horizontal position, the mercury switch 128 is opened and the circuit between the motor 52 and the source of electrical current is broken thus stopping the operation of pump 54 and aspirator 90. Therefore, the aspirator 90 is normally operated only during the period when the toilet is in use and throughout the completion of the flushing cycle thereof. However, should the system be exposed to an extraordinary amount of use, the motor, pump and aspirator may be operated by timed electrical means, such as, by a time clock so that the aspirator, pump and motor are run for longer periods of time, as may be desired. Furthermore, it may be desirable to run motor, pump and aspirator by timed electrical means should the system not be exposed to a regular continuous use such that the sewage in tank 32 and the fluid in tank 48 may be periodically and continually exposed to the jet of the aspirator and/or aerobically treated.

To put the system of this invention into operation the system enclosed within housing 10 is transported to the site at which it is desired to employ this self-contained toilet and sewage treatment plant. After arrival at the desired location, the housing and system contained therein are placed on the ground preferably such that the housing is setting in a fairly level position. The toilet tank 38 is then filled with water as well as sewage holding and treating tank 32. The level of water in this tank 32 should be well up into standpipe 72 but slightly below the ends of flow line 74 and air line 124 within the standpipe 72, as shown in FIG. 6. Fluid holding and treating tank 48 is also filled with clear water to a height just below the connection of overflow line 80. The filling of the system with water may take place either at the location where the system is to be put into operation or prior to the transportation of the system to the desired site of use. Additionally, to put the system into operation, it is required that mercury switch 128 be connected to a source of electrical current. Once the system has been filled with clear water and the electrical connection made it is ready for use and operation.

After the system of this invention is put into operation, excrement and/or waste may be deposited in the toilet bowl 36 of the toilet 34. After such use of the toilet bowl 36 the same is flushed by using the flushing lever 42. The water contained within toilet tank 38 decreases in such tank and flows into the bowl 36 to aid in flushing thereof. The excrement, waste and water pass from the toilet through toilet drain pipe 37 leading from the toilet into the rearward section 58 of sewage holding and treating tank 32 and drop thereinto. The deposit of additional water and waste within tank 32 increases the fluid level therein to a point adjacent the top of standpipe 72 and a distance above the open bottom of flow line 74 and air line 124 which extend a distance downward into standpipe 72. As the water contained within toilet tank 38 leaves the same in the flushing of toilet bowl 36, the float 118 and lever arm 120 connected thereto move downward within the tank and opens valve 122. Also as the float 118 and lever arm 120 move downward mercury switch 128 is closed making contact between motor 52 and the source of electrical current such that the operation of motor 52, pump 54 and aspirator 90 begin. As the pump and aspirator are operated, the fluid supply therefor is drawn through intake line 100 and the air supply therefor is drawn or sucked in through air line 106. The action of the aspirator breaks-up and macerates the waste and excrement, continually circulating the sewage in tank 32 and aerobically treating and decomposing by the use of oxygen the decomposable organic waste materials suspended therein. The circulatory, round and round current in tank 32, particularly in the rearward section 58 thereof, increases the turbulent agitation within tank 32 thus keeping the particles of waste material in suspension until substantially all have been digested by the aspirator. As the aspirator 90 draws in air through air line 106, a vacuum is formed in the upper portion of fluid holding and treating tank 48. The vacuum within tank 48 sucks up through flow line 74 the additional water or fluid which was deposited in tank 32 when the toilet was flushed. Small amounts of water and fluid will also be drawn into the upper portion of tank 48 by the vacuum therein through air line 124, the open valve 122, and air line 126. The vacuum in tank 48 will draw in fluid and water from tank 32 until the level of water in this tank drops to a level just below the end of open air line 124. At this time or point in the flushing cycle, air will pass through standpipe 72, air line 124, the open valve 122 and air line 126 into the upper portion of tank 48 thereby releaving the vacuum in the top thereof and permitting the water and fluid within this tank 48 to feed by gravity through filter 84, fill line 86 and check valve 88 therein, and into the toilet tank 38 to replenish the supply of water in toilet tank 38. As water exits from tank 48 through fill line 86 and fills toilet tank 38 the lever arm 128 and attached float 118 will gradually move upward within the tank to a near horizontal position and valve 122 will be closed, such closing of valve 122 stopping the supply of air coming through line 124 and flowing through line 126 to the top portion of tank 48, and stopping the flow of water into toilet tank 38 from tank 48 through the fill line 86. As the air valve 122 is closed, aspirator 90 will again draw a vacuum in the upper portion of tank 48 and additionally draw further air through standpipe 72 and flow line 74 bubbling the same up through the remaining column of fluid in tank 48 to further aerobically treat the same. When the float 118 and attached lever arm 120 reach their horizontal or uppermost position within toilet tank 38, the mercury switch attached to lever arm 120 will open, thus de-energizing motor 52 and ceasing the operation of the aspirator means. A flushing cycle of the system is completed and the same is now ready for further use and flushing. Should it be desirable to operate the pump and aspirator without flushing the toilet 34, the mercury type switch 128 may be bypassed and the motor, pump and aspirator may be operated continuously or at timed intervals, such as, by electrically timed means as hereinabove indicated.

When the aspirator is operated other than during a flushing cycle of the system its air supply will come through the top of standpipe 72 moving upward only through flow line 74 bubbling its way through the column of fluid in tank 48 and through air intake line 106 passing to the aspirator. During such aspiration cycle, without flushing the toilet, the air supply will not flow through air lines 124 and 126 and valve 122, as valve 122 remains closed until the toilet is flushed.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what is desired to secure by Letters Patent of the United States is:

1. In a self-contained toilet and sewage treatment plant having a flush type toilet including a water storage tank and a toilet bowl in which waste and excreta are deposited, comprising a sewage treating tank below said toilet for receiving water and the deposited waste and excreta, a screen within said tank dividing the same into forward and rearward sections, said water and deposited waste being received in said rearward section, a fluid holding tank positioned above said sewage treating tank, a flow line communicating between said forward section of said sewage treating tank and said fluid holding tank, said fluid holding tank providing a reservoir of fluid with which to recharge the toilet water storage tank, another flow line communicating between said fluid holding tank and the toilet water storage tank, an aspirating means positioned within said rearward section of said sewage treating tank to comminute and aerobically decompose the deposited waste and excreta, and power means for operating said aspirating means.

2. In the self-contained toilet and sewage treatment plant as defined in claim 1, wherein said power means for operating said aspirating means includes an electrical motor connected to a source of electrical energy, a pump driven by said motor, flow line means communicating between said forward section of said sewage treating tank and said pump and said aspirating means for supplying fluid thereto, and an air flow line communicating between the upper portion of said fluid holding tank and said aspirating means for supplying air thereto, the air supplied to said aspirating means being drawn through the reservoir of fluid in said fluid holding tank to further aerobically treat said fluid.

3. In the self-contained toilet and sewage treatment plant as defined in claim 1, wherein said aspirating means includes an aspirator within a hollow housing having open ends, one of said open ends being positioned adjacent to the surface of the fluid within said sewage treating tank for gathering waste adjacent the fluid surface and directing the same toward the other said open end of said aspirator housing, said other open end being positioned forwardly of said aspirator with the jet from said aspirator being directed against a portion of said housing adjacent said other open end thereby increasing the comminution of the deposited waste and excreta therewithin.

4. In the self-contained toilet and sewage treatment plant as defined in claim 1, wherein control means are provided to initiate the operation of said power means when said toilet is flushed and terminate such operation when the water storage tank of the toilet has been recharged with fluid, said control means including a switch operable in response to movement of the float lever arm within the water storage tank of the toilet.

5. In a self-contained toilet and sewage treatment plant of a portable nature having a flush type toilet including a water storage tank and a toilet bowl for the deposit of waste and excreta, with the water storage tank containing a float and lever arm connected thereto, comprising a sewage treating tank positioned below the toilet for receiving and treating water and the waste and excreta deposited in the toilet bowl, an upright screen extending from top to bottom across the mid-section of said sewage treating tank to divide said tank into forward and rearward sections, said water and waste being received in said rearward section, said screen maintaining said waste in said rearward section, a standpipe positioned in said forward section of said sewage treating tank, a fluid holding tank positioned above said sewage treating tank to provide a reservoir of fluid with which to recharge the toilet water storage tank, said fluid holding tank communicating with said forward section of said sewage treating tank by a first flow line connected to the bottom of said fluid holding tank and extending into said standpipe such that fluid may pass into said fluid holding tank from said forward section, said fluid holding tank communicating with the toilet water storage tank by a second flow line to recharge the toilet water storage tank with fluid after a flushing of the toilet, aspirating means positioned within said rearward section of said sewage treating tank to comminute and aerobically decompose the deposited waste and excreta, said aspirating means including an aspirator within a hollow housing having open ends of unequal cross-sectional dimensions with the larger of said open ends being positioned adjacent the surface of the fluid within said sewage treating tank for gathering waste adjacent the fluid surface and directing the same toward the other said open end of said aspirator housing, said other open end being positioned forwardly of said aspirator with the jet from said aspirator being directed against a portion of said housing adjacent said other open end thereby increasing the comminution of the deposited waste and excreta therewithin, power means for supplying fluid to said aspirator including fluid flow line means communicating between said forward section of said sewage treating tank and said aspirator, a flow line for supplying air to said aspirator, said air flow line communicating between the upper portion of said fluid holding tank and said aspirator whereby the air is drawn through the reservoir of fluid in said fluid holding tank to further aerobically treat said fluid therein, control means to initiate the operation of said power means when said toilet is flushed and terminate such operation when the water storage tank of the toilet has been recharged with fluid.

6. In the portable, self-contained toilet and sewage treatment plant as defined in claim 5, wherein said power means includes an electrical motor and a pump driven by said motor, said control means including a mercury type switch mounted on the lever arm contained within the water storage tank of the toilet and connected in circuit between a source of electrical energy and said motor.

7. In the portable, self-contained toilet and sewage treatment plant as defined in claim 5, wherein said fluid being passed through said aspirator draws the air through said air flow line and creates a vacuum in said upper portion of said fluid holding tank, further including relief means connected to said upper portion of said fluid holding tank to periodically relieve the vacuum formed therein to permit fluid contained within said fluid holding tank to feed by gravity through said second flow line to recharge to toilet water storage tank after flushing thereof.

8. In the portable, self-contained toilet and sewage treatment plant defined in claim 7, wherein said relief means includes a third flow line communicating between the upper portion of said standpipe and said upper portion of said fluid holding tank, and a valve in said third flow line between its ends, said valve being normally in its closed position to maintain the vacuum within said tank upper portion.

9. In the portable, self-contained toilet and sewage treatment plant as defined in claim 8, wherein said valve is operatively connected to the lever arm of the toilet tank, said valve being in the closed position when the lever arm and its attached float are in the non-flushing position, said valve being in the open position when the lever arm and float are in a flushing position.

10. In the portable, self-contained toilet and sewage treatment plant as defined in claim 5, including a check valve in said first flow line to permit fluid to pass into said fluid holding tank from said forward section of said sewage treating tank and prevent the same from passing from said fluid holding tank into said forward section of said sewage treating tank.

11. In the portable, self-contained toilet and sewage treating plant as defined in claim 5, further including an overflow line extending through said upper portion of said fluid holding tank, said overflow line being connected to said fluid holding tank above the normal fluid level maintained therein and below the connection of said air flow line within said upper portion of said fluid holding tank, said overflow line having a check valve therein, said check valve when in its open position permitting excess fluids to pass outward of said fluid holding tank and when in its closed position forming an air tight seal in said overflow line such that a vacuum may be formed in said upper portion of said fluid holding tank.

12. In the portable, self-contained toilet and sewage treatment plant as defined in claim 5, additionally including a check valve in said second flow line for permitting fluid to pass from said fluid holding tank into the toilet water storage tank and preventing passage of fluid from said toilet water storage tank into said fluid holding tank.

References Cited

UNITED STATES PATENTS

| 1,081,130 | 12/1913 | Miller | 4—115 |
|---|---|---|---|
| 1,303,358 | 5/1919 | Montgomery | 4—115 |
| 2,740,971 | 4/1956 | Weekes | 4—115 |
| 3,042,933 | 7/1962 | Garver | 4—115 |
| 3,067,433 | 12/1962 | Dietz et al. | 4—115 |
| 3,112,497 | 12/1963 | Call | 4—115 |
| 3,183,525 | 5/1965 | O'Brien et al. | 4—115 |
| 3,289,214 | 12/1966 | Corliss | 4—115 |

FOREIGN PATENTS

| 1,355,440 | 2/1964 | France. |
|---|---|---|

LAVERNE D. GEIGER, *Primary Examiner.*

D. MASSENBERG, *Assistant Examiner.*